(12) United States Patent
Brady

(10) Patent No.: US 6,244,392 B1
(45) Date of Patent: Jun. 12, 2001

(54) BICYCLE BRAKING SYSTEM

(76) Inventor: Noel J. Brady, 16 Lissenfield, Rathmines, Dublin 6 (IE)

( * ) Notice: Subject to any disclaimer, the term of this patent is extended or adjusted under 35 U.S.C. 154(b) by 0 days.

(21) Appl. No.: 09/426,156

(22) Filed: Oct. 22, 1999

(51) Int. Cl.[7] .................................................. B62L 3/60
(52) U.S. Cl. ..................................... 188/24.21; 188/24.12
(58) Field of Search ........................... 188/24.11, 24.12, 188/24.13, 24.14, 24.15, 24.16, 24.21, 24.22, 25, 26

(56) References Cited

U.S. PATENT DOCUMENTS

| D. 260,015 | 7/1981 | Sheill . | |
|---|---|---|---|
| 4,823,916 | * 4/1989 | Shyu | ................... 188/24.12 |
| 5,147,265 | 9/1992 | Pauls et al. . | |
| 5,201,236 | 4/1993 | Nagano . | |
| 5,377,792 | 1/1995 | Idesawa . | |
| 5,385,216 | 1/1995 | Kulczycki . | |
| 5,501,301 | * 3/1996 | Nishimura | .......................... 188/24.12 |
| 5,564,531 | * 10/1996 | Lumpkin | ............................ 188/24.12 |

FOREIGN PATENT DOCUMENTS

| 4226818 | * 2/1994 | (DE) | ................................. 188/24.12 |

* cited by examiner

Primary Examiner—Christopher P. Schwartz
Assistant Examiner—Devon Kramer

(57) ABSTRACT

A bicycle braking system for permitting controlled rotation and continuous power to the wheels of a bicycle during braking of the bicycle to enhance control of the bicycle during braking includes a cylindrical brake pad that is spring loaded within angled slots in a casing. The brake pad is positioned proximate the rim of a wheel and a cable assembly is coupled to the brake pad for urging the brake pad towards an end of the angled slots and against the rim of the wheel to slow rotation of the wheel.

18 Claims, 5 Drawing Sheets

BICYCLE BRAKING SYSTEM

BACKGROUND OF THE INVENTION

1. Field of the Invention

The present invention relates to bicycle brakes and more particularly pertains to a new bicycle braking system for permitting controlled rotation and continuous power to the wheels of a bicycle during braking of the bicycle to enhance control of the bicycle during braking.

2. Description of the Prior Art

The use of bicycle brakes is known in the prior art. More specifically, bicycle brakes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,823,916; U.S. Pat. No. 5,201,236; U.S. Pat. No. 5,147,265; U.S. Pat. No. 5,385,216; U.S. Pat. No. 5,377,792; and U.S. Pat. No. Des. 260,015.

While these devices fulfill their respective, particular objectives and requirements, the aforementioned patents do not disclose a new bicycle braking system. The inventive device includes a cylindrical brake pad that is spring loaded within angled slots in a casing. The brake pad is positioned proximate the rim of a wheel and a cable assembly is coupled to the brake pad for urging the brake pad towards an end of the angled slots and against the rim of the wheel to slow rotation of the wheel.

In these respects, the bicycle braking system according to the present invention substantially departs from the conventional concepts and designs of the prior art, and in so doing provides an apparatus primarily developed for the purpose of permitting controlled rotation and continuous power to the wheels of a bicycle during braking of the bicycle to enhance control of the bicycle during braking.

SUMMARY OF THE INVENTION

In view of the foregoing disadvantages inherent in the known types of bicycle brakes now present in the prior art, the present invention provides a new bicycle braking system construction wherein the same can be utilized for permitting controlled rotation and continuous power to the wheels of a bicycle during braking of the bicycle to enhance control of the bicycle during braking.

The general purpose of the present invention, which will be described subsequently in greater detail, is to provide a new bicycle braking system apparatus and method which has many of the advantages of the bicycle brakes mentioned heretofore and many novel features that result in a new bicycle braking system which is not anticipated, rendered obvious, suggested, or even implied by any of the prior art bicycle brakes, either alone or in any combination thereof.

To attain this, the present invention generally comprises a cylindrical brake pad that is spring loaded within angled slots in a casing. The brake pad is positioned proximate the rim of a wheel and a cable assembly is coupled to the brake pad for urging the brake pad towards an end of the angled slots and against the rim of the wheel to slow rotation of the wheel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bicycle braking system apparatus and method which has many of the advantages of the bicycle brakes mentioned heretofore and many novel features that result in a new bicycle braking system which is not anticipated, rendered obvious, suggested, or even implied by any of the prior art bicycle brakes, either alone or in any combination thereof.

It is another object of the present invention to provide a new bicycle braking system that may be easily and efficiently manufactured and marketed.

It is a further object of the present invention to provide a new bicycle braking system that is of a durable and reliable construction.

An even further object of the present invention is to provide a new bicycle braking system which is susceptible of a low cost of manufacture with regard to both materials and labor, and which accordingly is then susceptible of low prices of sale to the consuming public, thereby making such bicycle braking system economically available to the buying public.

Still yet another object of the present invention is to provide a new bicycle braking system which provides in the apparatuses and methods of the prior art some of the advantages thereof, while simultaneously overcoming some of the disadvantages normally associated therewith.

Still another object of the present invention is to provide a new bicycle braking system for permitting controlled rotation and continuous power to the wheels of a bicycle during braking of the bicycle to enhance control of the bicycle during braking.

Yet another object of the present invention is to provide a new bicycle braking system which includes a cylindrical brake pad that is spring loaded within angled slots in a casing. The brake pad is positioned proximate the rim of a wheel and a cable assembly is coupled to the brake pad for urging the brake pad towards an end of the angled slots and against the rim of the wheel to slow rotation of the wheel.

Still yet another object of the present invention is to provide a new bicycle braking system that prevents locking of a wheel during braking.

Even still another object of the present invention is to provide a new bicycle braking system that permits a user to maintain continued pedaling tension during braking of a cycle to enhance control of the cycle while braking and permit smooth acceleration immediately following braking of the cycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
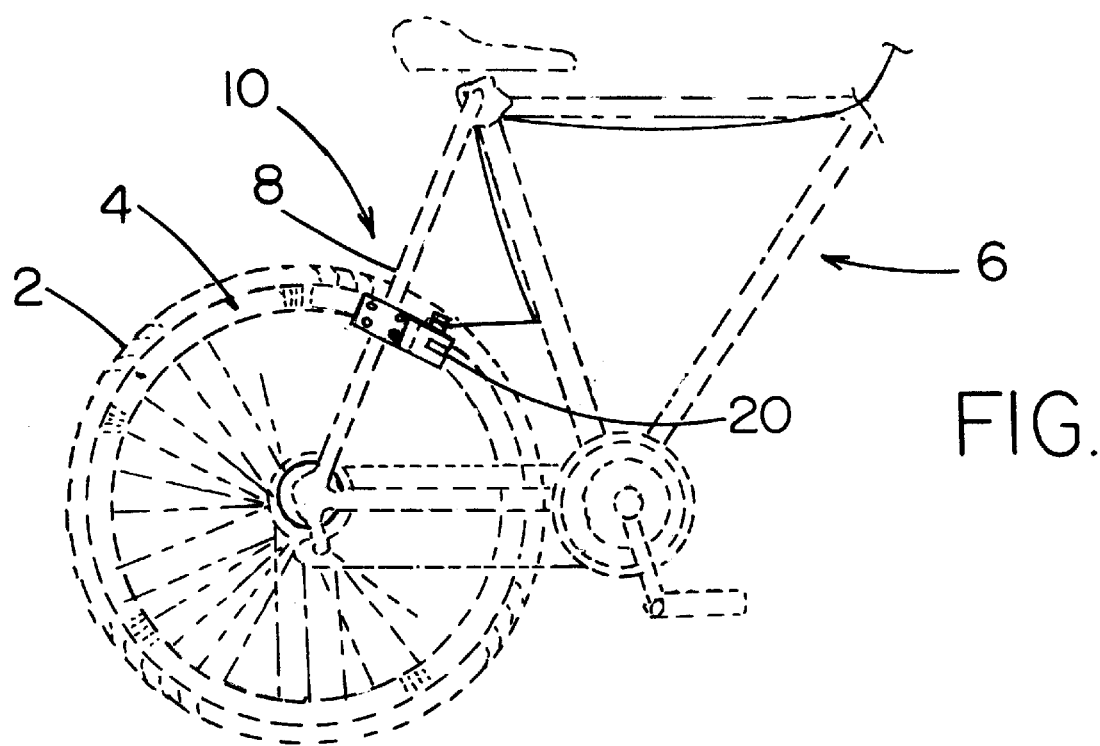
FIG. 1 is a side view of a new bicycle braking system according to the present invention.
Figure 2:
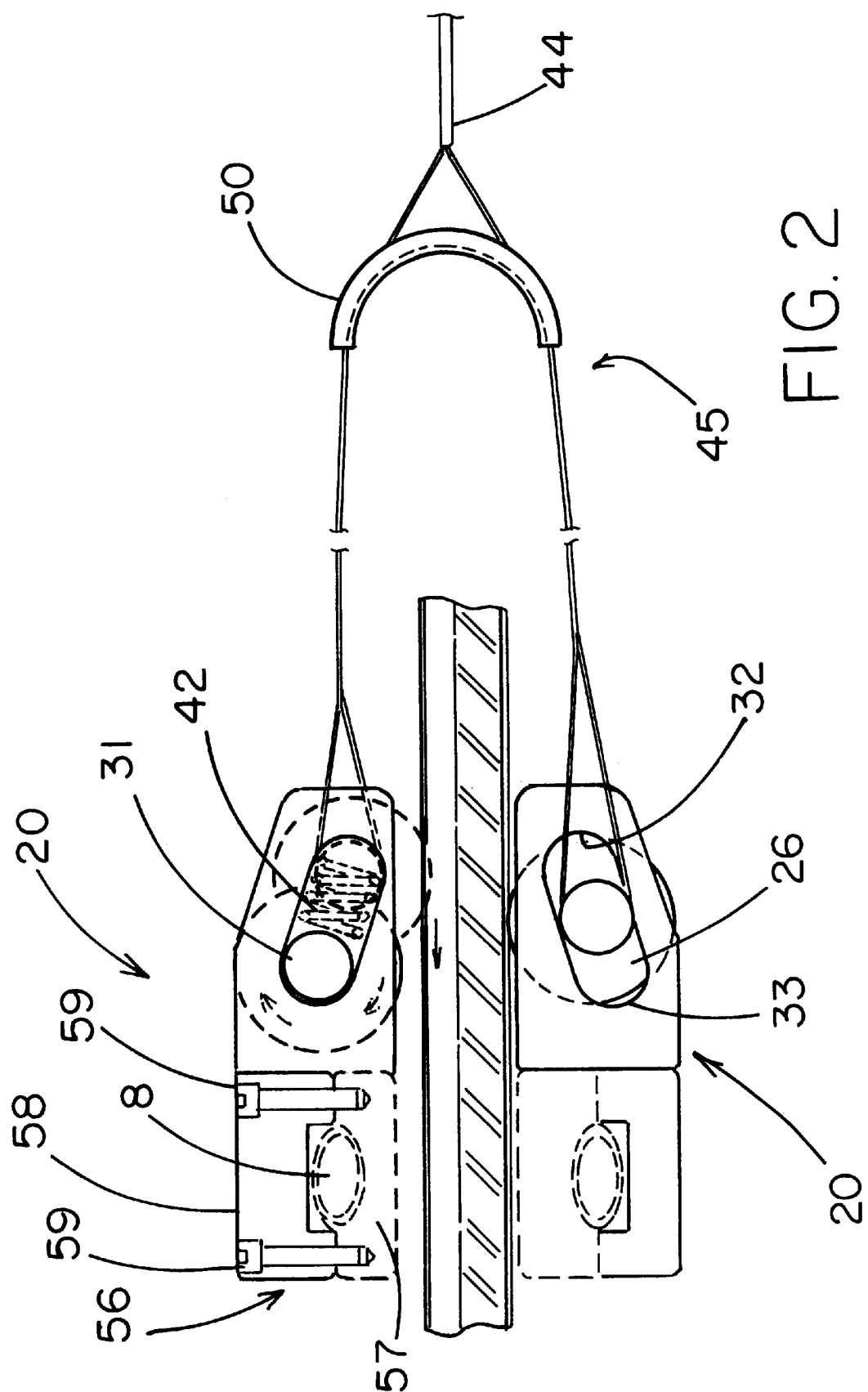
FIG. 2 is a top view of the present invention.
Figure 3:
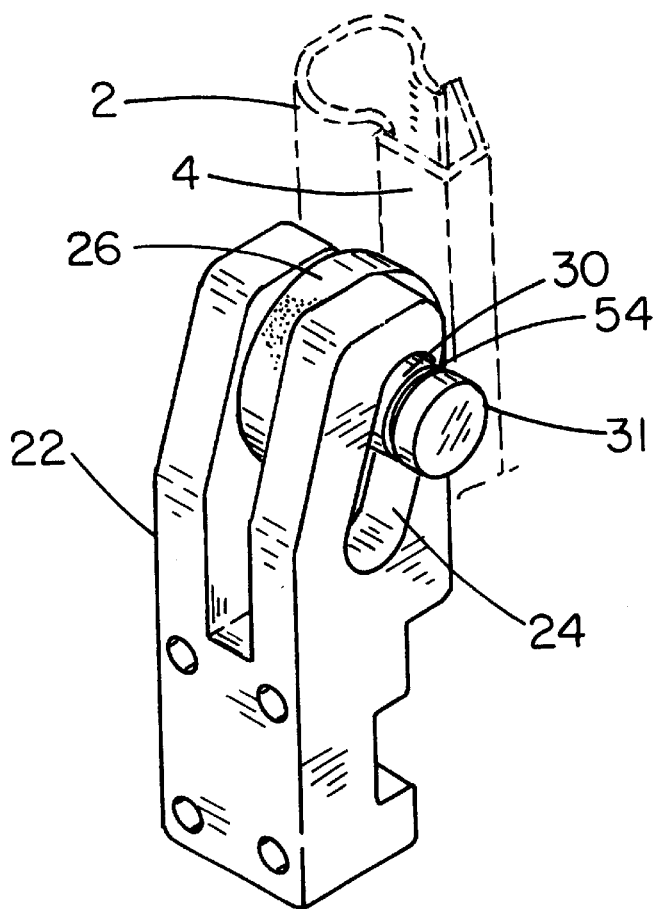
FIG. 3 is a bottom perspective view of the present invention.
Figure 4:
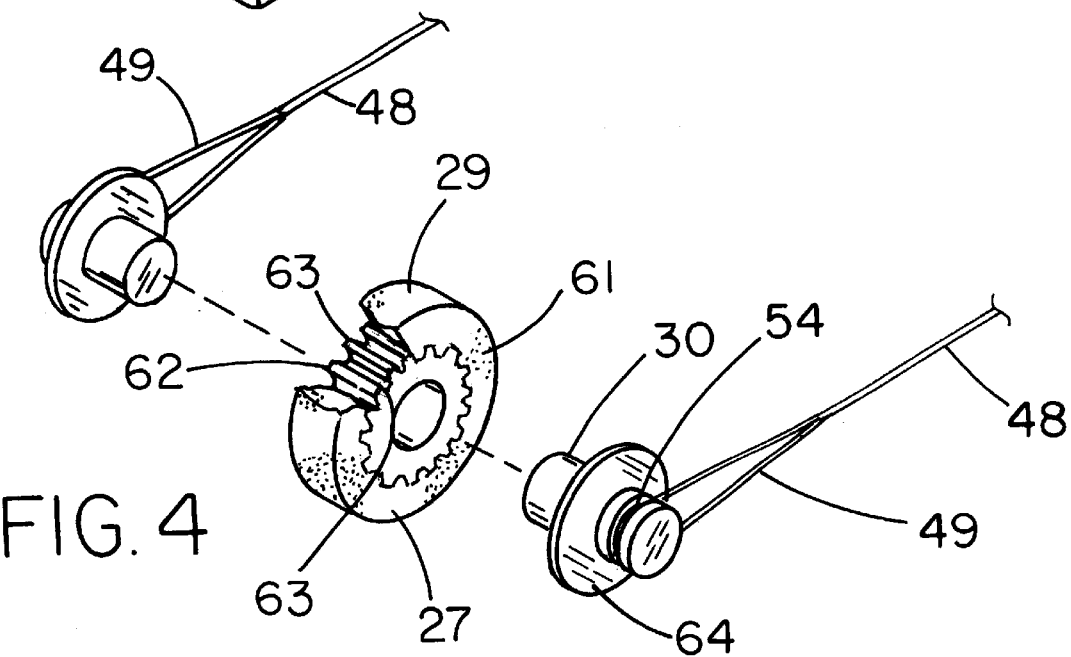
FIG. 4 is a perspective view of the brake pad of the present invention.
Figure 5:
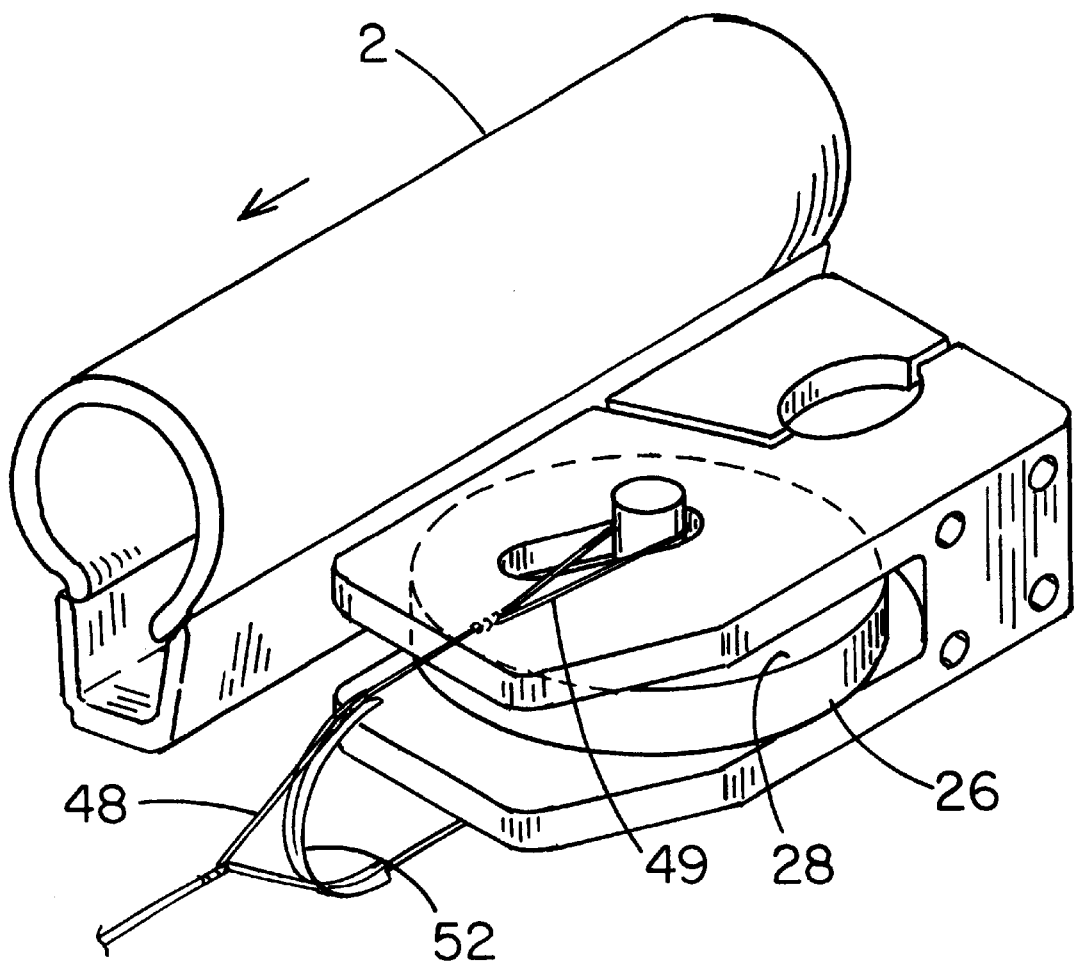
FIG. 5 is a perspective view of the present invention in a disengaged state.
Figure 6:
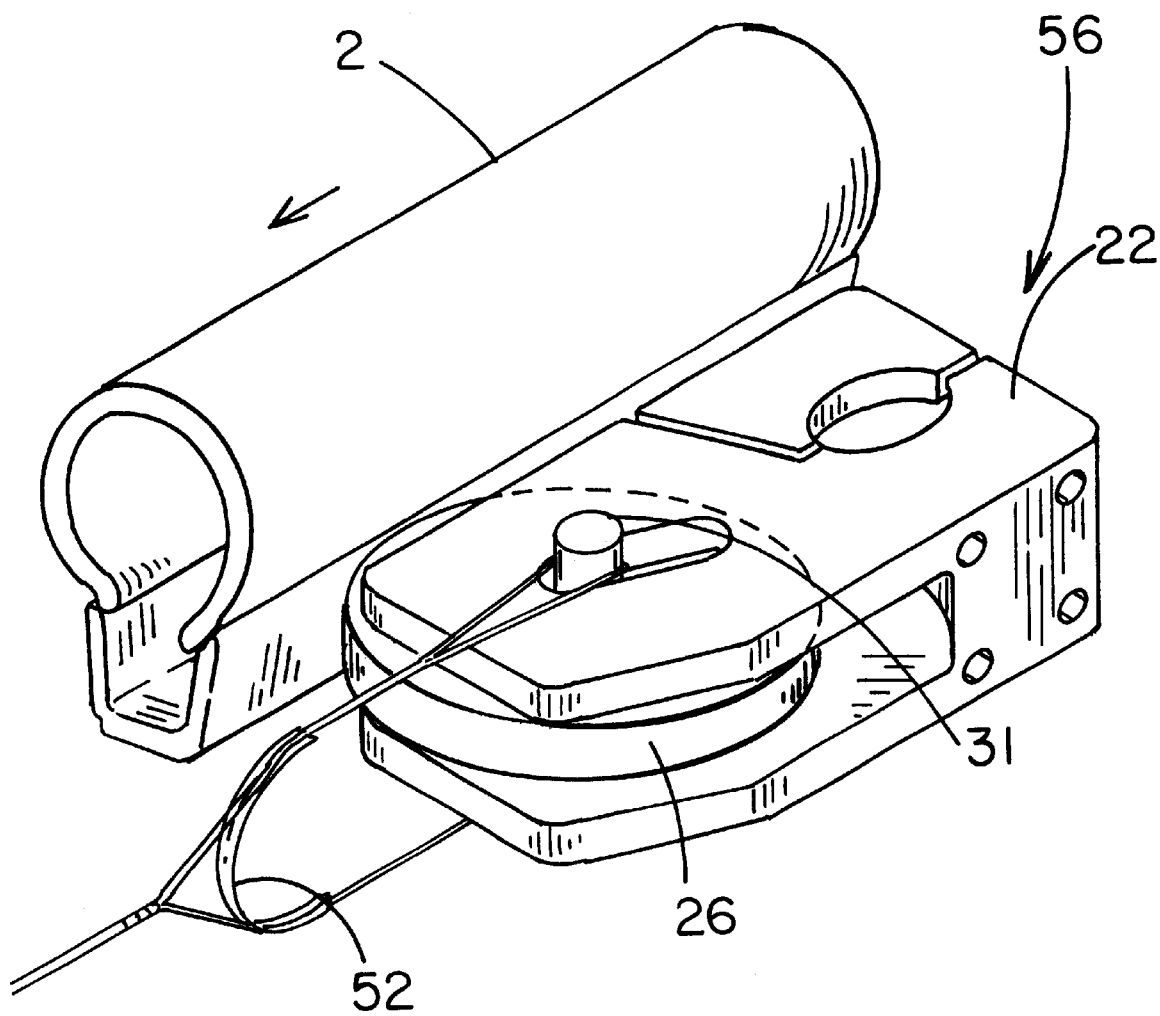
FIG. 6 is a perspective view of the present invention in an engaged state.

With reference now to the drawings, and in particular to FIGS. 1 through 6 thereof, a new bicycle braking system embodying the principles and concepts of the present invention and generally designated by the reference numeral 10 will be described.

As best illustrated in FIGS. 1 through 6, the cycle braking system 10 generally comprises a pair of braking assemblies 20 positioned on opposite sides of a wheel 2 having a rim 4. Each braking assembly generally includes a casing 22 designed for coupling to the cycle 6. The casing includes a pair of angled slots 24 and a cylindrical brake pad 26. The brake pad includes opposite sides 27 and 28 and an outer perimeter wall 29 extending between the opposite sides. The brake pad further includes an axle 30 having opposite ends 31 extending outwardly from the opposite sides of the brake pad. Each of the opposite ends 31 of the brake pad are positioned in an associated one of the angled slots in the casing.

The angled slots each includes a first end 32 and a second end 33. The casing is positioned such that the first ends of the angled slots are positioned proximate the rim of the wheel such that the brake pad contacts the rim when the opposite ends of the axle are positioned proximate the first ends of the angled slots. The second ends are positioned such that the brake pad is positioned in a spaced relationship to the rim when the opposite ends of the axle are positioned proximate the second ends of the angled slots.

A cable assembly 40 is coupled to each of the braking assemblies such that the cable assembly is designed for selectively urging the brake pads of each brake assembly into contact with opposite sides of the rim such that a portion of the rim is clamped between the brake pads. The cylindrical nature of the brake pads permits clamping such that the brake pads rotate to facilitate continued pedaling of the cycle during braking for enhancing a user's control of the cycle.

Each braking assembly includes a pair of biasing assemblies 42 coupled to the casing. Each biasing assembly is positioned within a respective one of the angled slots and in contact with an associated one of the opposite ends of the axle for biasing the brake pad towards the second ends of the angled slots. Thus, the brake pad is prevented from contacting the rim of the wheel when the cable assembly is not actuated.

The cable assembly includes a main cable 44, the cable 44 includes a first portion 45 divided into two strands 46. Each of the strands includes a pair of free ends 48. Each free end forms a loop 49 engaged to a respective one of the opposite ends of a respective one of the axles.

The cable assembly further includes an arcuate main spacer 50 positioned between the strands for dividing the strands and positioning the strands on opposite sides of the wheel. The cable assembly further includes a pair of arcuate casing spacers 52 each being positioned between an associated pair of the free ends for positioning the associated free ends on opposite sides of the casing and preventing the free ends from contacting the casing.

Each opposite end of the axle includes a groove 54 designed for receiving a portion of a respective one of the loops such that the respective loop is engaged to the axle.

Each casing includes a clamping portion 56 having a frame receiving portion 57 and a clamping member 58. The frame receiving portion is designed for abutting a frame 8 of the cycle and the clamping member is engageable to the frame receiving portion. The clamping portion is tightened such that the clamping portion clamps the frame between the frame receiving portion and the clamping member, thus engaging the casing to the frame. Each clamping member is coupled to the frame receiving portion by a plurality of screws 59.

Each brake pad includes a bearing 60 rotationally coupled to the axle. Each brake pad further includes a frictional material 61 extending radially outward from the bearing. Each bearing includes a plurality of teeth 62 having a pair of ends 63. The teeth extend across an outer surface of the bearing for preventing rotation of the frictional material relative to the bearing.

Each axle includes a pair of separable portions 64. Each portion includes a disc-shaped guard portion 66 for covering the ends of the teeth for preventing the ends from snagging on the casing.

In an embodiment, a single brake assembly is used and the cable assembly requires only one casing spacer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A braking system for a cycle having at least one wheel, the wheel having a rim, the braking system comprising:
   a braking assembly including
      a casing adapted for coupling to the cycle, the casing having a pair of angled slots,
      a cylindrical brake pad having opposite sides and an outer perimeter wall extending between the opposite sides, said brake pad further having an axle having opposite ends extending outwardly from said opposite sides of said brake pad, each of said opposite ends of said brake pad being positioned in an associated one of said angled slots in said casing, and
      said angled slots each having a first end and a second end, said casing being positioned such that said first ends of said angled slots are positioned proximate the rim of the wheel such that said brake pad contacts the rim when the opposite ends of the axle are positioned proximate said first ends of said angled slots, said second ends being positioned such that said brake pad is positioned in a spaced relationship to the rim when said opposite ends of said axle are positioned proximate said second ends of said angled slots; and
   a cable assembly, said cable assembly being coupled to the braking assembly, said cable assembly being adapted for urging the braking assembly into contact with the rim to slow rotation of the wheel.

2. The braking system of claim 1, further comprising:
   said braking assembly including a biasing member for biasing said brake pad towards said second ends of said angled slots whereby said brake pad is prevented from contacting the rim of the wheel when said cable assembly is not actuated.

3. The braking system of claim 1 further comprising:
   a pair of biasing assemblies coupled to said casing, each biasing assembly being positioned within a respective one of said angled slots for biasing said brake pad towards said second ends of said angled slots whereby said brake pad is prevented from contacting the rim of the wheel when said cable assembly is not actuated.

4. The braking system of claim 1, further comprising:
   said cable assembly having a pair of free ends, each free end forming a loop engaged to a respective one of said opposite ends of said axle; and
   said cable assembly further having an arcuate casing spacer positioned between said free ends for preventing said free ends from contacting said casing.

5. The braking system of claim 4, further comprising:
   each opposite end of said axle having a groove, said groove being for receiving a portion of a respective one of said loops such that said respective loop is engaged to said axle.

6. The braking system of claim 1, further comprising:
   said casing having a clamping portion, said clamping portion having a frame receiving portion and a clamping member, said frame receiving portion being adapted for abutting a frame of the cycle, said clamping member being engageable to said frame receiving portion such that said clamping portion of said casing is adapted for clamping the frame between the frame receiving portion and the clamping member, whereby said casing is engaged to the frame.

7. The braking system of claim 6 wherein the clamping member is coupled to the frame receiving portion by a plurality of screws.

8. The braking system of claim 1, further comprising:
   said brake pad having a bearing rotationally coupled to said axle;
   said brake pad having a frictional material extending radially outward from said bearing; and
   said bearing having a plurality of teeth having a pair of ends, said teeth extending across an outer edge of said bearing for preventing rotation of said frictional material relative to said bearing.

9. The braking system of claim 8, further comprising:
   said axle having a pair of separable portions, each portion having a disc-shaped guard portion for covering said ends of said teeth for preventing said ends from snagging on said casing.

10. A braking system for a cycle having at least one wheel, the wheel having a rim, the braking system comprising:
    a pair of braking assemblies, each braking assembly including
       a casing adapted for coupling to the cycle, the casing having a pair of angled slots,
       a cylindrical brake pad having opposite sides and an outer perimeter wall extending between the opposite sides, said brake pad further having an axle having opposite ends extending outwardly from said opposite sides of said brake pad, each of said opposite ends of said brake pad being positioned in an associated one of said angled slots in said casing, and
       said angled slots each having a first end and a second end, said casing being positioned such that said first ends of said angled slots are positioned proximate the rim of the wheel such that said brake pad contacts the rim when the opposite ends of the axle are positioned proximate said first ends of said angled slots, said second ends being positioned such that said brake pad is positioned in a spaced relationship to the rim when said opposite ends of said axle are positioned proximate said second ends of said angled slots;
    each braking assembly being adapted for coupling proximate a respective side of the rim of the wheel; and
    a cable assembly being coupled to each of said braking assemblies such that said cable assembly is adapted for selectively urging the brake pads of each brake assembly into contact with opposite sides of said rim such that a portion of the rim is clamped between the brake pads such that the brake pads rotate to facilitate continued pedaling of the cycle during braking for enhancing a user's control of the cycle.

11. The braking system of claim 10 further comprising:
    each braking assembly having a pair of biasing assemblies coupled to said casing, each biasing assembly being positioned within a respective one of said angled slots for biasing said brake pad towards said second ends of said angled slots whereby said brake pad is prevented from contacting the rim of the wheel when said cable assembly is not actuated.

12. The braking system of claim 10, further comprising:

said cable assembly having a cable, said cable having a first portion divided into two strands, each of said strands having a pair of free ends, each free end forming a loop engaged to a respective one of said opposite ends of a respective one of said axles; and said cable assembly further having an arcuate main spacer positioned between said strands for dividing said strands and positioning said strands on opposite sides of the wheel; and said cable assembly further having a pair of arcuate casing spacers, each casing spacer being positioned between an associated pair of said free ends for positioning said associated free ends on opposite sides of said casing and preventing said free ends from contacting said casing.

13. The braking system of claim 12, further comprising:

each opposite end of said axle having a groove, said groove being for receiving a portion of a respective one of said loops such that said respective loop is engaged to said axle.

14. The braking system of claim 10, further comprising:

each said casing having a clamping portion, said clamping portion having a frame receiving portion and a clamping member, said frame receiving portion being adapted for abutting a frame of the cycle, said clamping member being engageable to said frame receiving portion such that said clamping portion of said casing is adapted for clamping the frame between the frame receiving portion and the clamping member, whereby said casing is engaged to the frame.

15. The braking system of claim 14 wherein each clamping member is coupled to the frame receiving portion by a plurality of screws.

16. The braking system of claim 10, further comprising:

each said brake pad having a bearing rotationally coupled to said axle;

each said brake pad having a frictional material extending radially outward from said bearing; and each said bearing having a plurality of teeth having a pair of ends, said teeth extending across an outer edge of said bearing for preventing rotation of said frictional material relative to said bearing.

17. The braking system of claim 16, further comprising:

each said axle having a pair of separable portions, each portion having a disc-shaped guard portion for covering said ends of said teeth for preventing said ends from snagging on said casing.

18. A braking system for a cycle having at least one wheel, the wheel having a rim, the braking system comprising:

a pair of braking assemblies, each braking assembly including
  a casing adapted for coupling to the cycle, the casing having a pair of angled slots,
  a cylindrical brake pad having opposite sides and an outer perimeter wall extending between the opposite sides, said brake pad further having an axle having opposite ends extending outwardly from said opposite sides of said brake pad, each of said opposite ends of said brake pad being positioned in an associated one of said angled slots in said casing, and
  said angled slots each having a first end and a second end, said casing being positioned such that said first ends of said angled slots are positioned proximate the rim of the wheel such that said brake pad contacts the rim when the opposite ends of the axle are positioned proximate said first ends of said angled slots, said second ends being positioned such that said brake pad is positioned in a spaced relationship to the rim when said opposite ends of said axle are positioned proximate said second ends of said angled slots;

each braking assembly being adapted for coupling proximate a respective side of the rim of the wheel;

a cable assembly being coupled to each of said braking assemblies such that said cable assembly is adapted for selectively urging the brake pads of each brake assembly into contact with opposite sides of said rim such that a portion of the rim is clamped between the brake pads such that the brake pads rotate to facilitate continued pedaling of the cycle during braking for enhancing a user's control of the cycle;

each braking assembly having a pair of biasing assemblies coupled to said casing, each biasing assembly being positioned within a respective one of said angled slots for biasing said brake pad towards said second ends of said angled slots whereby said brake pad is prevented from contacting the rim of the wheel when said cable assembly is not actuated;

said cable assembly having a cable, said cable having a first portion divided into two strands, each of said strands having a pair of free ends, each free end forming a loop engaged to a respective one of said opposite ends of a respective one of said axles;

said cable assembly further having an arcuate main spacer positioned between said strands for dividing said strands and positioning said strands on opposite sides of the wheel;

said cable assembly further having a pair of arcuate casing spacers, each casing spacer being positioned between an associated pair of said free ends for positioning said associated free ends on opposite sides of said casing and preventing said free ends from contacting said casing;

each opposite end of said axle having a groove, said groove being for receiving a portion of a respective one of said loops such that said respective loop is engaged to said axle;

each said casing having a clamping portion, said clamping portion having a frame receiving portion and a clamping member, said frame receiving portion being adapted for abutting a frame of the cycle, said clamping member being engageable to said frame receiving portion such that said clamping portion of said casing is adapted for clamping the frame between the frame receiving portion and the clamping member, whereby said casing is engaged to the frame;

wherein each clamping member is coupled to the frame receiving portion by a plurality of screws;

each said brake pad having a bearing rotationally coupled to said axle;

each said brake pad having a frictional material extending radially outward from said bearing;

each said bearing having a plurality of teeth having a pair of ends, said teeth extending across an outer edge of said bearing for preventing rotation of said frictional material relative to said bearing; and each said axle having a pair of separable portions, each portion having a disc-shaped guard portion for covering said ends of said teeth for preventing said ends from snagging on said casing.

* * * * *